(12) United States Patent
Hellfeier et al.

(10) Patent No.: US 8,267,435 B2
(45) Date of Patent: Sep. 18, 2012

(54) CHARGE-AIR HOSE ASSEMBLY

(75) Inventors: Jörg Hellfeier, Hannoversch-Münden (DE); Hartmut Brill, Bad Soden-Allendorf (DE); Helmut Hoffmann, Bodenfelde (DE); Peter Reichardt, Ludwigsburg (DE); Dieter Bamberger, Stuttgart (DE); Karl-Heinz Siebels, Stuttgart (DE)

(73) Assignee: ContiTech MGW GmbH, Hannoversch-Muenden (DE)

( * ) Notice: Subject to any disclaimer, the term of this patent is extended or adjusted under 35 U.S.C. 154(b) by 0 days.

(21) Appl. No.: 12/654,786

(22) Filed: Jan. 4, 2010

(65) Prior Publication Data

US 2010/0140923 A1 Jun. 10, 2010

Related U.S. Application Data

(63) Continuation of application No. PCT/EP2008/056163, filed on May 20, 2008.

(30) Foreign Application Priority Data

Jul. 6, 2007 (DE) .......................... 10 2007 031 614

(51) Int. Cl.
*F16L 39/00* (2006.01)
(52) U.S. Cl. ......................... 285/321; 285/319; 285/307
(58) Field of Classification Search .................. 285/319, 285/321, 307
See application file for complete search history.

(56) References Cited

U.S. PATENT DOCUMENTS

| | | | | |
|---|---|---|---|---|
| 472,342 A * | 4/1892 | Draudt | ........................... | 285/317 |
| 2,440,452 A * | 4/1948 | Smith | ........................... | 285/317 |
| 2,525,667 A * | 10/1950 | Wallace et al. | ........... | 285/141.1 |
| 3,093,703 A * | 6/1963 | Zavertnik | ........................ | 174/86 |
| 4,063,760 A * | 12/1977 | Moreiras | ........................ | 285/242 |
| 4,725,081 A * | 2/1988 | Bauer | .......................... | 285/305 |
| 4,750,765 A * | 6/1988 | Cassidy et al. | ................ | 285/321 |
| 4,884,829 A * | 12/1989 | Funk et al. | ........................ | 285/24 |
| 5,273,323 A * | 12/1993 | Calmettes et al. | ............ | 285/321 |
| 5,431,454 A * | 7/1995 | Calmettes et al. | ................ | 285/3 |
| 5,979,946 A * | 11/1999 | Petersen et al. | ............... | 285/305 |
| 6,186,180 B1 * | 2/2001 | Moller et al. | .................... | 138/89 |
| 6,361,064 B1 * | 3/2002 | Hopf et al. | ................. | 280/728.1 |
| 6,561,720 B2 * | 5/2003 | Wirth et al. | .................... | 403/280 |
| 7,497,478 B2 | 3/2009 | Callahan | | |
| 7,614,665 B2 | 11/2009 | Hartmann | | |
| 7,722,089 B2 * | 5/2010 | Nauer | ........................... | 285/321 |
| 2006/0145475 A1 * | 7/2006 | Walker et al. | ................. | 285/319 |

FOREIGN PATENT DOCUMENTS

| | | |
|---|---|---|
| DE | 3831611 A1 * | 3/1990 |
| DE | 10 2005 032 341 | 2/2007 |
| EP | 0 856 696 | 8/1998 |
| GB | 2239503 A * | 7/1991 |
| WO | WO 2007/006410 | 1/2007 |

* cited by examiner

*Primary Examiner* — Aaron Dunwoody
(74) *Attorney, Agent, or Firm* — Walter Ottesen (57) ABSTRACT

A charge-air hose assembly includes a charge-air hose (2) for connecting to a pipe stub (4). The charge-air hose (2), in the assembled position, is pushed into the pipe stub (4) in such a way that overpressure occurring in the charge-air hose (2) presses the charge-air hose (2) radially outward against the radial inner wall (6) of the pipe stub (4). The charge-air hose (2) is assigned a latching device which, during the insertion of the charge-air hose (2) into the pipe stub (4), latches with the pipe stub (4) so as to axially fix the charge-air hose (2) to the pipe stub (4) in a predetermined axial position of the charge-air hose (2) relative to the pipe stub (4).

20 Claims, 5 Drawing Sheets

CHARGE-AIR HOSE ASSEMBLY

CROSS REFERENCE TO RELATED APPLICATIONS

This application is a continuation application of international patent application PCT/EP 2008/056163, filed May 20, 2008, designating the United States and claiming priority from German application 10 2007 031 614.5, filed Jul. 6, 2007, and the entire content of both applications is incorporated herein by reference.

FIELD OF THE INVENTION

The invention relates to a charge-air hose assembly for connecting a charge-air hose to a pipe stub.

BACKGROUND OF THE INVENTION

Such charge-air hoses are used, for example, in internal combustion engines provided with a turbocharger, wherein the charge-air hose conducts the charge air compressed by the turbocharger into a charge-air cooler and/or conducts it to the engine intake.

German patent publication 10 2005 32 341 B3 discloses a charge-air hose of the relevant type which, in the assembly position, is inserted into a pipe stub in such a way that overpressure occurring in the charge-air hose presses the charge-air hose radially outward against the radial inner wall of the pipe stub. The known charge-air hose is fastened to the pipe stub via a sleeve formed from resilient material and a retaining collar of L-shaped cross section whose axial leg lies against the sleeve and which lies with its radial leg against the hose.

Because of its design, the known charge-air hose allows a simple assembly on the pipe stub and a relatively secure connection between the hose and the pipe stub.

SUMMARY OF THE INVENTION

The object of the invention is to provide a charge-air hose assembly of the type mentioned above wherein the assembly of the charge-air hose on the pipe stub is further simplified and wherein the connection between the charge-air hose and the pipe stub in the assembled position of the charge-air hose is still further improved.

The charge-air hose assembly of the invention includes: a pipe stub having a radial inner wall; a charge-air hose insertable into the stub whereat the charge-air hose assumes a predetermined axial position relative to the pipe stub; the pipe stub and the charge-air hose conjointly defining a sealing interface at the predetermined axial position so as to permit an overpressure in the charge-air hose to press the charge-air hose radially outwardly against the radial inner wall thereby providing a seal at the sealing interface; and, a latching device for latching the charge-air hose to the pipe stub to axially fix the charge-air hose to the pipe stub at the predetermined axial position when the charge-air hose is inserted into the pipe stub.

The basic idea of the teaching according to the invention is to separate from one another the functions which are to be performed when connecting the charge-air hose (which is also referred to as the hose below) to the pipe stub. These functions are, on the one hand, sealing of the hose with respect to the pipe stub and a secure fastening of the hose to the pipe stub on the other hand. The sealing function is achieved according to the invention in that the hose, in the assembly position, is inserted into the pipe stub such that overpressure occurring in the hose presses the hose radially outward against the radial inner wall of the pipe stub and thereby ensures the required sealing. The function of fastening the hose to the pipe stub is achieved according to the invention in that the hose is assigned a latching device which, during the insertion of the hose into the pipe stub, latches with the pipe stub in order to axially fix the hose to the pipe stub in a predetermined axial position of the hose relative to the pipe stub. According to the invention, a latching connection between the hose and the pipe stub is thus formed by means of which the hose is held securely on the pipe stub even under axial loading.

A particular advantage of the hose according to the invention is that the hose can be mounted on the pipe stub in a particularly simple manner and the correct assembly can be checked in a particularly simple manner. For this purpose, the hose is inserted axially into the pipe stub and introduced to such an extent into the pipe stub until the latching means latch with the pipe stub. With a suitable design of the latching means, this latching can be distinctly audible so that it is possible for a worker to check acoustically that the hose is correctly mounted on the pipe stub. Since, owing to the latching with the pipe stub, the hose in the assembled position is always situated in a predetermined axial position relative to the pipe stub, a visual check of the correct assembly is additionally made possible. Such a visual check can be achieved, for example, in that the axial distance between the free ends of the spring ring or a mark made on the hose and the pipe stub is measured.

Furthermore, an advantage of the hose according to the invention is that it can be connected to the pipe stub without tools and can be simply disassembled in the case of repair.

A further advantage of the hose according to the invention is that it offers particularly good long-term sealing in the assembly position.

A further advantage of the charge-air hose assembly according to the invention is that it can be produced relatively simply and cost-effectively.

The basic principle according to the invention of the connection between a hose and a pipe stub can also be applied to cooling-water hoses.

According to the invention, the latching device can be arranged at any suitable location on the charge-air hose. In order to further simplify the structure of the charge-air hose assembly according to the invention and thus make it more cost-effective, an advantageous development of the teaching according to the invention provides that the latching device is arranged on the radial outer surface of the charge-air hose. In this embodiment, the radial outer surface of the charge-air hose latches with the radial inner wall of the pipe stub.

Advantageously, the latching device has at least one latching projection which is assigned to the charge-air hose and which, in the latching position, engages in a latching cutout assigned to the pipe stub. Here, the number, design and arrangement of the latching projection or of the latching projections can be set within wide limits to suit the requirements.

In order to ensure a particularly simple structure of the latching device, another development of the teaching according to the invention provides that the latching projection is outwardly spring-loaded in the radial direction and that the latching cutout is a cutout extending in the radial direction.

In the embodiments with the latching cutout, this cutout can in principle be formed on a separate component fixedly connected to the pipe stub. In order to simplify the structure further still and thus make it even more cost-effective, an advantageous development provides that the latching cutout is formed in or on the pipe stub.

Here, the latching cutout can advantageously be a slot formed in the pipe stub or a groove formed on the radial inner wall of the pipe stub, as is provided by another feature of the invention. The advantage of a slot is that it can be made in the pipe stub from the radial outer surface by means of a suitable tool so that it is not necessary to machine the pipe stub on its radial inner wall.

According to the invention, it is sufficient if, in the embodiment with the latching projection and the latching cutout, only one latching projection and one associated latching cutout are provided. In order to further improve the fixing of the charge-air hose to the pipe stub, an advantageous development of the teaching according to the invention provides that at least two latching projections spaced from one another in the circumferential direction of the pipe stub and associated latching cutouts are provided.

According to the invention, the latching device can be designed in any suitable manner. An extraordinarily advantageous development of the teaching according to the invention provides that the latching device comprises at least one spring ring which is resilient in the radial direction. In this embodiment, the latching device is designed in a particularly simple and hence cost-effective manner.

An advantageous development of the aforementioned embodiment provides that the spring ring is connected to the charge-air hose via a substantially form-stable holding part. In this embodiment, the holding part can lie, for example and in particular, against the pipe stub and serve to absorb axial forces.

A development of the embodiment with the holding part provides that the holding part is connected in a form-fitting manner to the charge-air hose in the axial direction. In this embodiment, an axial displacement of the holding part and hence of the spring ring relative to the charge-air hose is avoided so that the attachment of the charge-air hose to the pipe stub is further improved.

A further development of the embodiments with the holding part provides that the holding part is accommodated in a circumferential groove formed on the outer surface of the charge-air hose. A corresponding circumferential groove can be formed in the outer surface of the charge-air hose during the production of the charge-air hose.

An extraordinarily advantageous development of the embodiments with the spring ring provides that the spring ring has radially inwardly projecting segments by means of which it is supported on the charge-air hose or the holding part, and at least one radially outwardly projecting segment which forms a latching projection. In this embodiment, the latching projection or the latching projections is or are formed in one piece with the spring ring, thereby resulting in a particularly simple and cost-effective structure.

Another advantageous development of the embodiment with the spring ring provides that the spring ring is of open design in the circumferential direction, wherein its free ends are bent off or angled off so as to extend substantially in the radial direction. In this embodiment, the spring ring can be compressed by pressing together its free ends in the radial direction, with the result that latching projections formed on the spring ring come free from the associated latching cutouts in order, for example, to release the charge-air hose from the pipe stub.

In order to further improve the sealing between the pipe stub and the charge-air hose, an advantageous development of the teaching according to the invention provides that the clear inner width of the pipe stub in a contact region, in which, in the assembled position, the insertion end of the hose lies against the radial inner wall of the pipe stub, decreases in the insertion direction. In this way, particularly effective sealing is achieved in the contact region.

In the aforementioned embodiment, the radial inner wall of the pipe stub in the contact region can be formed in cross section substantially in the manner of a circular arc or conically, at least in certain portions, as is provided by an advantageous feature of the invention.

In order to improve the sealing between charge-air hose and pipe stub still further, another advantageous development of the teaching according to the invention provides that the insertion end of the charge-air hose is designed in a substantially complementary manner in cross section to the contact region. In this embodiment, by virtue of its complementary shape, the insertion end of the charge-air hose in the assembled position lies, even in the pressureless state, closely against the inner wall of the pipe stub, thereby resulting in effective sealing even in the pressureless state. The sealing is further improved by overpressure occurring in the charge-air hose, this overpressure pressing the insertion end of the charge-air hose against the radial inner wall of the pipe stub.

In order to further simplify the mounting of the charge-air hose, another advantageous development of the teaching according to the invention provides that the charge-air hose is assigned an axial stop which acts in the insertion direction. In this embodiment, the charge-air hose, when being inserted into the pipe stub, comes to lie against the stop, thereby reliably avoiding assembly errors.

A particularly advantageous development of the aforementioned embodiment provides that the stop is arranged in the axial direction of the pipe stub in such a way that the latching device latches with the pipe stub when the charge-air hose is situated relative to the pipe stub in an axial position fixed by the stop. In this embodiment, the latching device latches with the pipe stub as soon as the charge-air hose is situated in the desired assembly position.

In order to form the stop in a particularly simple and cost-effective manner, an advantageous development of the embodiments with the stop provides that the stop is a shoulder formed on the radial inner wall of the pipe stub.

In order to further simplify the mounting of the charge-air hose according to the invention, another advantageous development provides means for fixing the position of the charge-air hose in the circumferential direction relative to the pipe stub when inserting the charge-air hose into the pipe stub. In this way, it is ensured that, during insertion into the pipe stub, the charge-air hose is oriented in the circumferential direction in such a way that the latching device can latch with the pipe stub, for example, a latching projection in the circumferential direction is situated opposite a latching cutout formed in the pipe stub.

An advantageous development of the aforementioned embodiment and of the embodiment with the spring ring provides that the means for fixing the position of the charge-air hose in the circumferential direction comprise a slot which extends from the free end of the pipe stub in the axial direction. In this slot, the free ends of the spring ring are guided when inserting the charge-air hose into the pipe stub. In this embodiment, the assembly of the charge-air hose is further simplified in that the orientation of the charge-air hose in the circumferential direction is fixed relative to the pipe stub as a result of the free ends of the spring ring being inserted into the slot.

Advantageously, in the assembled position of the charge-air hose, the latching device forms a releasable latching connection between the charge-air hose and the pipe stub.

In order to facilitate disassembly of the charge-air hose from the pipe stub, another advantageous development of the embodiments with the spring ring provides that, in the assembled position, the free ends of the spring ring project beyond the radial outer wall of the pipe stub. In this embodiment, the free ends of the spring ring projecting beyond the radial outer wall of the pipe stub can be gripped by means of a tool and pressed together in order to radially compress the spring ring, with the result that the latching device unlatches and the charge-air hose can be disassembled from the pipe stub.

In order to further simplify the assembly of the charge-air hose on the pipe stub, another development of the teaching according to the invention provides that the free end of the pipe stub that faces the charge-air hose during assembly has a peripheral bevel in order to form an insertion slope for the insertion of the charge-air hose. In this embodiment, the insertion of the charge-air hose into the pipe stub is simplified. Moreover, in particular in this embodiment, the charge-air hose can be assembled on the pipe stub without tools.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
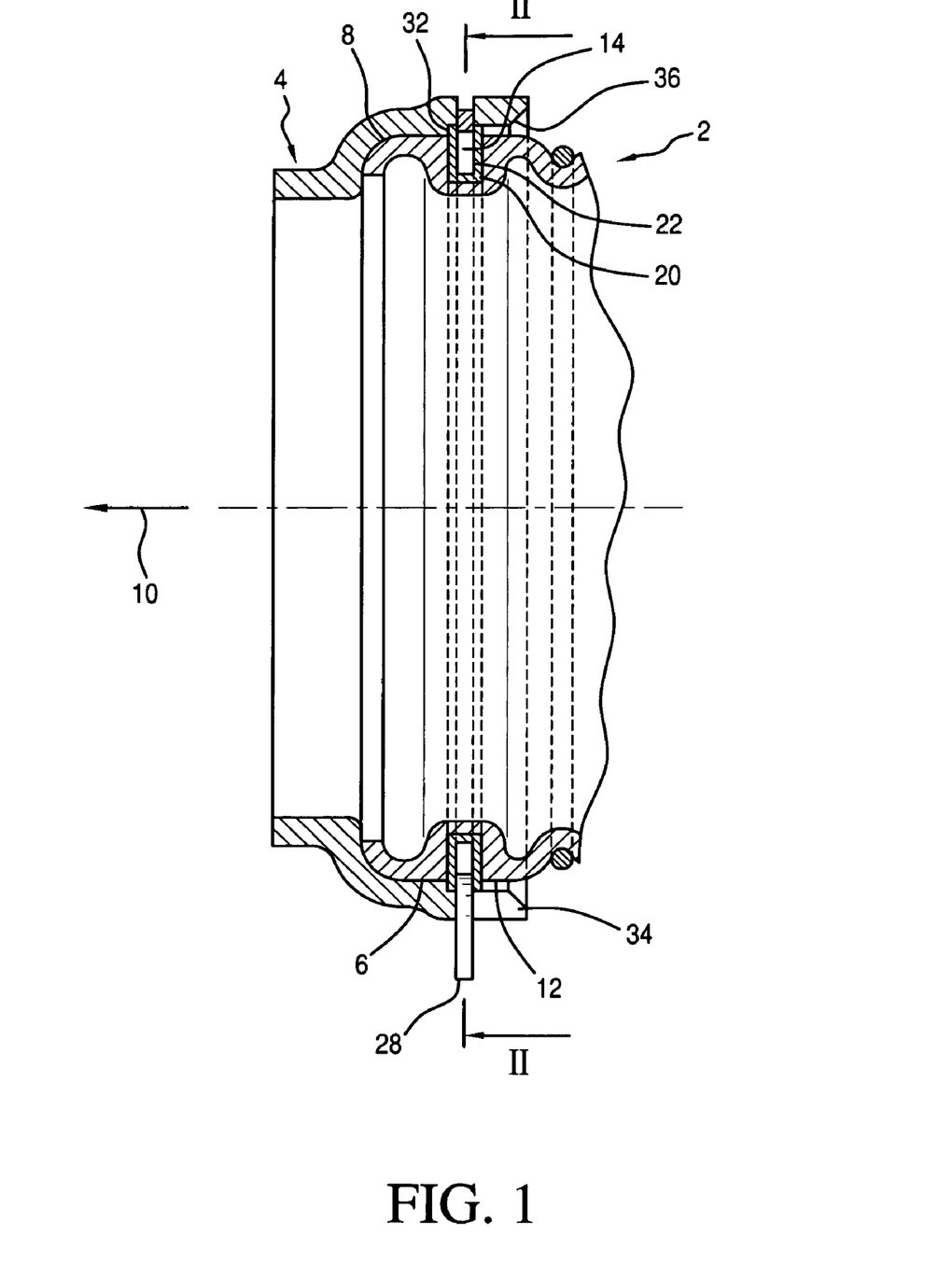
FIG. 1 shows an axial section through an exemplary embodiment of a charge-air hose assembly according to the invention in the assembled position.

FIG. 1 shows an exemplary embodiment of a hose 2 according to the invention which is designed as a bellows-like charge-air hose of which only one end can be seen in FIG. 1. The hose 2 is intended for connection to a pipe stub 4, and, in the assembled position shown in FIG. 1, the hose 2 is inserted into the pipe stub 4 in such a way that overpressure occurring in the hose 2 presses the hose 2 radially outward against the radial inner wall 6 of the pipe stub 4. As can be seen from FIG. 1, the clear inner width of the pipe stub 4 decreases in a contact region 8 in which, in the assembled position, the insertion end of the hose 2 lies against the radial inner wall 6 of the pipe stub 4. The insertion direction is symbolized by arrow 10 in FIG. 1. In the embodiment illustrated, the radial inner wall 6 of the pipe stub 4 in the contact region 8 is formed, in cross section, substantially in the manner of a circular arc in certain portions. The insertion end of the hose 2 is designed to be substantially complementary in cross section to the contact region 8. This results in particularly good sealing between the hose 2 and pipe stub 4 when the hose 2 is in the assembled position on the pipe stub 4.

According to the invention, the hose 2 is assigned a latching device which, during the insertion of the hose 2 into the pipe stub 4, latches with the pipe stub 4 in order to axially fix the hose 2 to the pipe stub 4 in a predetermined axial position of the hose 2 relative to the pipe stub 4. In this exemplary embodiment, this latching device, which is explained in more detail below with respect to FIG. 2, is arranged on the radial outer surface 12 of the hose 2.

Figure 2:
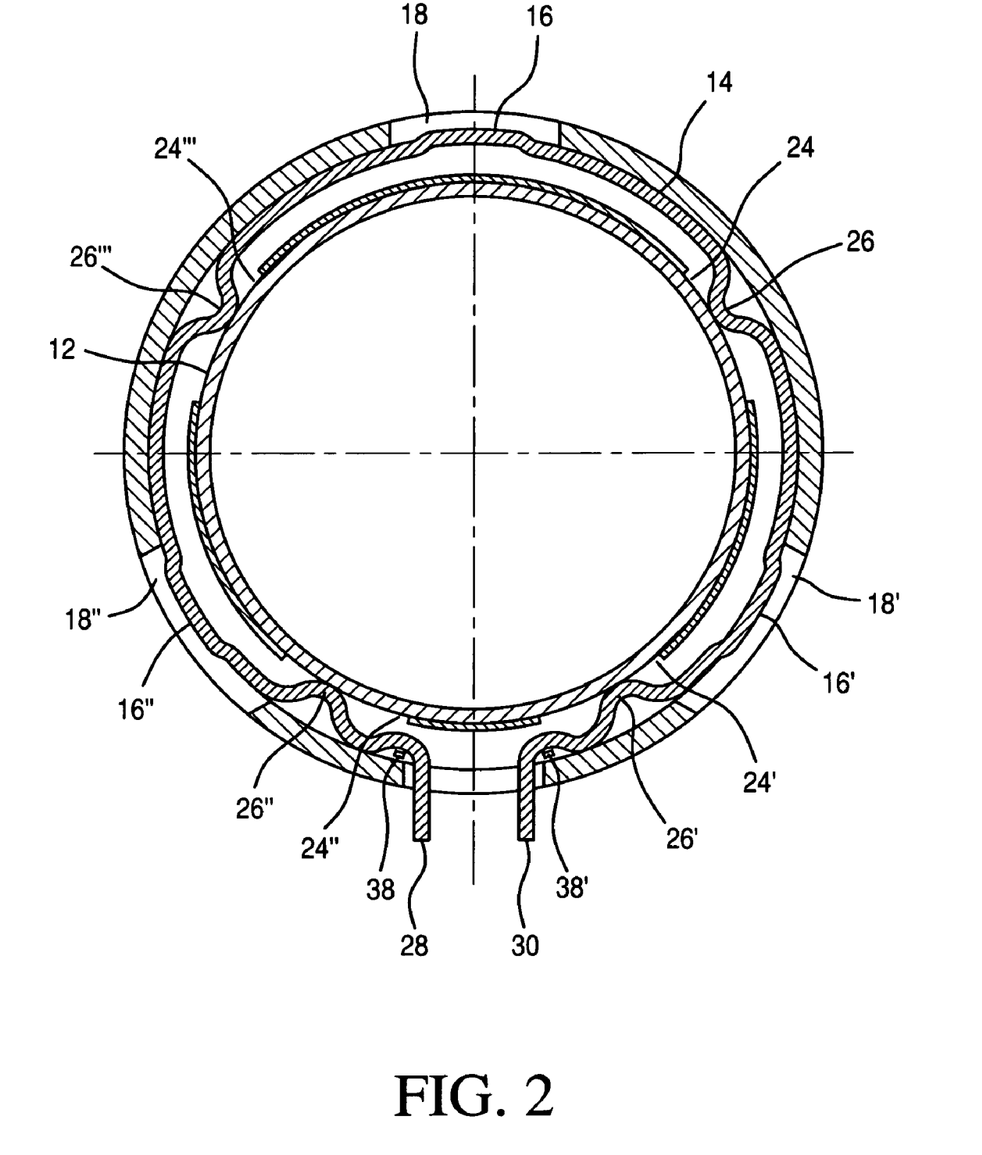
FIG. 2 shows a radial section through the hose of FIG. 1 along a line II-II in FIG. 1.

FIG. 2 shows a radial section through the hose 2 and the pipe stub 4 according to FIG. 1. In this exemplary embodiment, the latching device comprises a spring ring 14 which is resilient in the radial direction and which has a projection which projects in the radial direction. This projection forms a latching projection 16 and latches into a latching cutout 18 when the hose 2 is in the assembled position. The latching cutout in this embodiment is formed by a slot which is formed in the outer wall of the pipe stub 4 and extends in the circumferential direction. In the embodiment illustrated in the drawing, in addition to the latching projection 16, still further correspondingly formed latching projections 16' and 16" are provided which are assigned correspondingly formed latching cutouts 18' and 18" in the form of slots. As can be seen from FIG. 2, the latching projections (16, 16', 16") are each offset with respect to one another by 120° along the circumference of the hose 2, and the slots (18, 18', 18") are correspondingly likewise arranged offset with respect to one another by in each case 120° in the circumferential direction of the pipe stub 4.

In this exemplary embodiment, the spring ring 14 is connected to the hose 2 via a substantially form-stable holding part in the form of a holding ring 20 (FIG. 1). In this embodiment, the spring ring 14 is accommodated in a circumferential groove 22 formed on the outer surface of the holding ring 20. As can be seen from FIG. 2, the holding ring 20 has slots (24, 24', 24" and 24''') which are spaced one from another in the circumferential direction and which extend in the circumferential direction. These slots are arranged in the circumferential direction in such a way that, in the assembled position, they are situated opposite radially inwardly projecting segments (26, 26', 26" and 26''') of the spring ring 14, with the result that, in the assembled position, the spring ring 14 is supported by the radially inwardly projecting segments (26 to 26''') on the radial outer surface 12 of the hose 2.

In this embodiment, the spring ring 14 has an open design in the circumferential direction with its free ends (28, 30) being bent off so as to extend substantially in the radial direction, as can be seen from FIG. 2. By pressing together the free ends (28, 30), the spring ring 14 can be compressed radially against its spring action.

In the embodiment illustrated in the drawing, the hose 2 is assigned an axial stop which acts in the insertion direction 10 and which is formed by a shoulder 32 formed on the radial inner wall 6 (FIG. 1) of the pipe stub 4. The shoulder 32 is arranged in the axial direction of the pipe stub 4 in such a way that the latching projections (16, 16' and 16") latch into the associated latching cutouts (18, 18' and 18") when the hose 2 is situated relative to the pipe stub 4 in an axial position fixed by the shoulder 32.

Also provided in the embodiment illustrated are means for fixing the position of the hose 2 in the circumferential direction with respect to the pipe stub 4 during insertion of the hose 2 into the pipe stub 4. These means comprise, in this embodiment, a slot 34 (FIG. 1) which extends from the free end of the pipe stub 4 in the axial direction and in which the free ends (28, 30) of the spring ring 14 are guided when inserting the hose 2 into the pipe stub 4.

In order to facilitate the insertion of the hose 2 into the pipe stub 4 during assembly, a circumferential bevel 36 is provided so as to form an insertion slope on the free end of the pipe stub 4 facing the hose 2. Because the spring ring 14 is centered on the hose 2 by the radially inwardly projecting portions (26 to 26'''), a minimum bevel is sufficient as an insertion slope.

The mode of operation of the hose 2 according to the invention will now be described.

Figure 3:
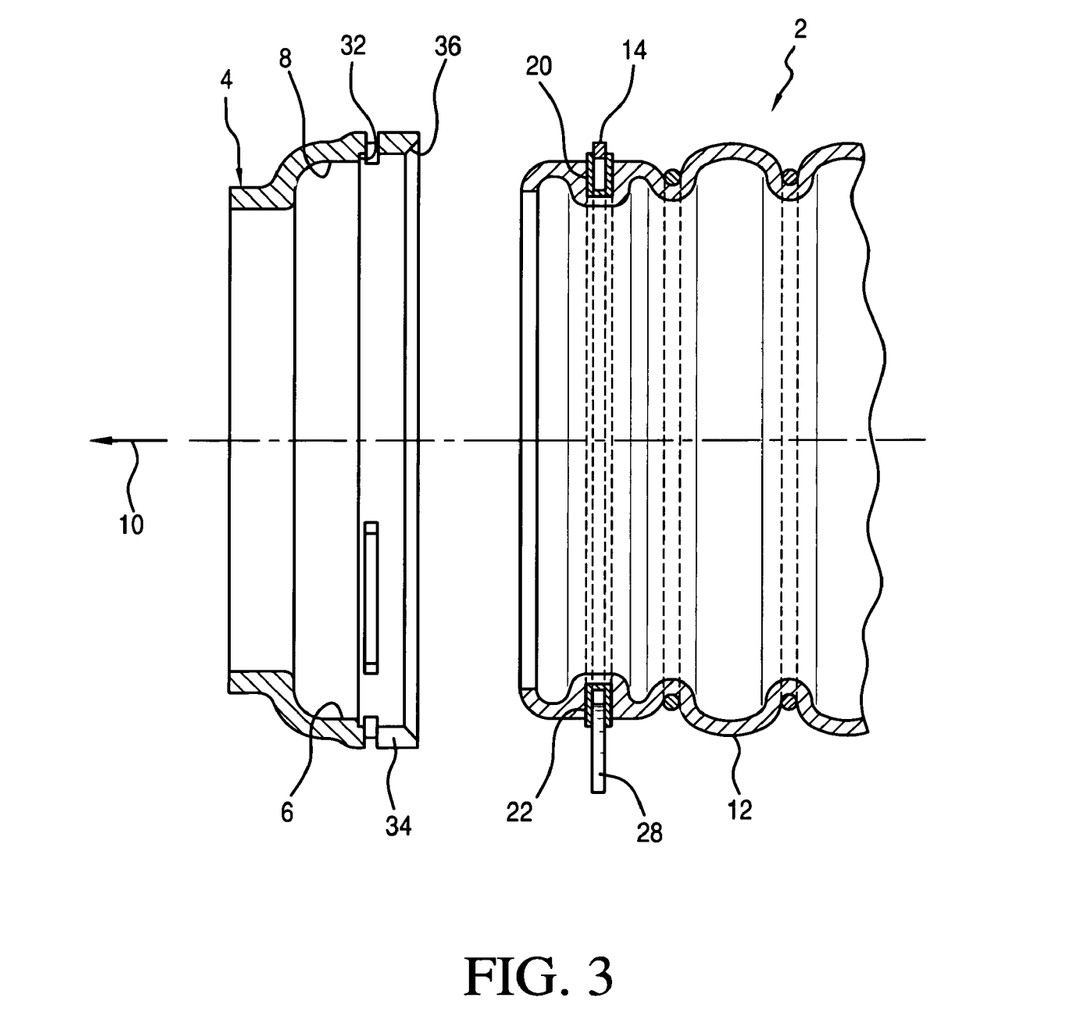
FIG. 3 shows, in the same representation as FIG. 1, the charge-air hose according to FIG. 1 prior to assembly on the pipe stub.

FIG. 3 shows the hose 2 prior to assembly on the pipe stub 4.

To mount the hose 2 on the pipe stub 4, the hose 2 is inserted into the pipe stub 4 with its insertion end in the insertion direction 10, with the insertion being facilitated by the bevel 36. During insertion of the hose 2 into the pipe stub 4, the latching projections (16, 16', 16") come to lie resiliently against the radial inner wall 6 of the pipe stub 4 so that the spring ring 14 is radially compressed. Here, the position of the hose 2 is fixed in the circumferential direction as a result of the free ends (28, 30) of the spring ring 14 being guided in the axial slot 34 in the pipe stub 4.

Figure 4:
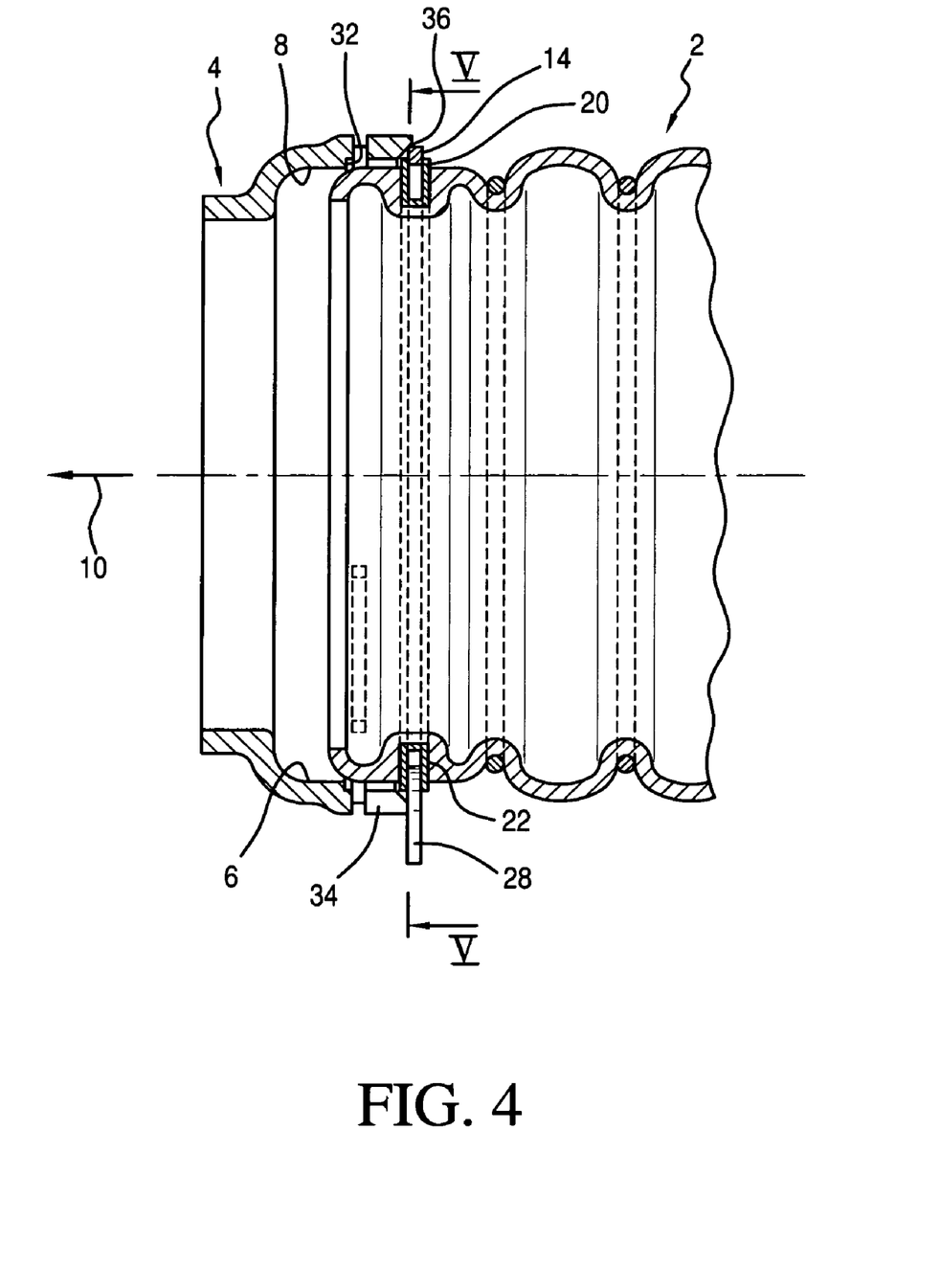
FIG. 4 shows, in the same representation as FIG. 1, the hose according to FIG. 1 during the assembly when inserting into the pipe stub; and, FIG. 5 shows a radial section through the charge-air hose assembly of FIG. 4 along a line V-V of FIG. 4.

FIG. 4 shows the hose 2 during assembly on the pipe stub 4 in an axial position in which the spring ring 14 runs onto the bevel 36 and begins to be compressed radially.

Figure 5:
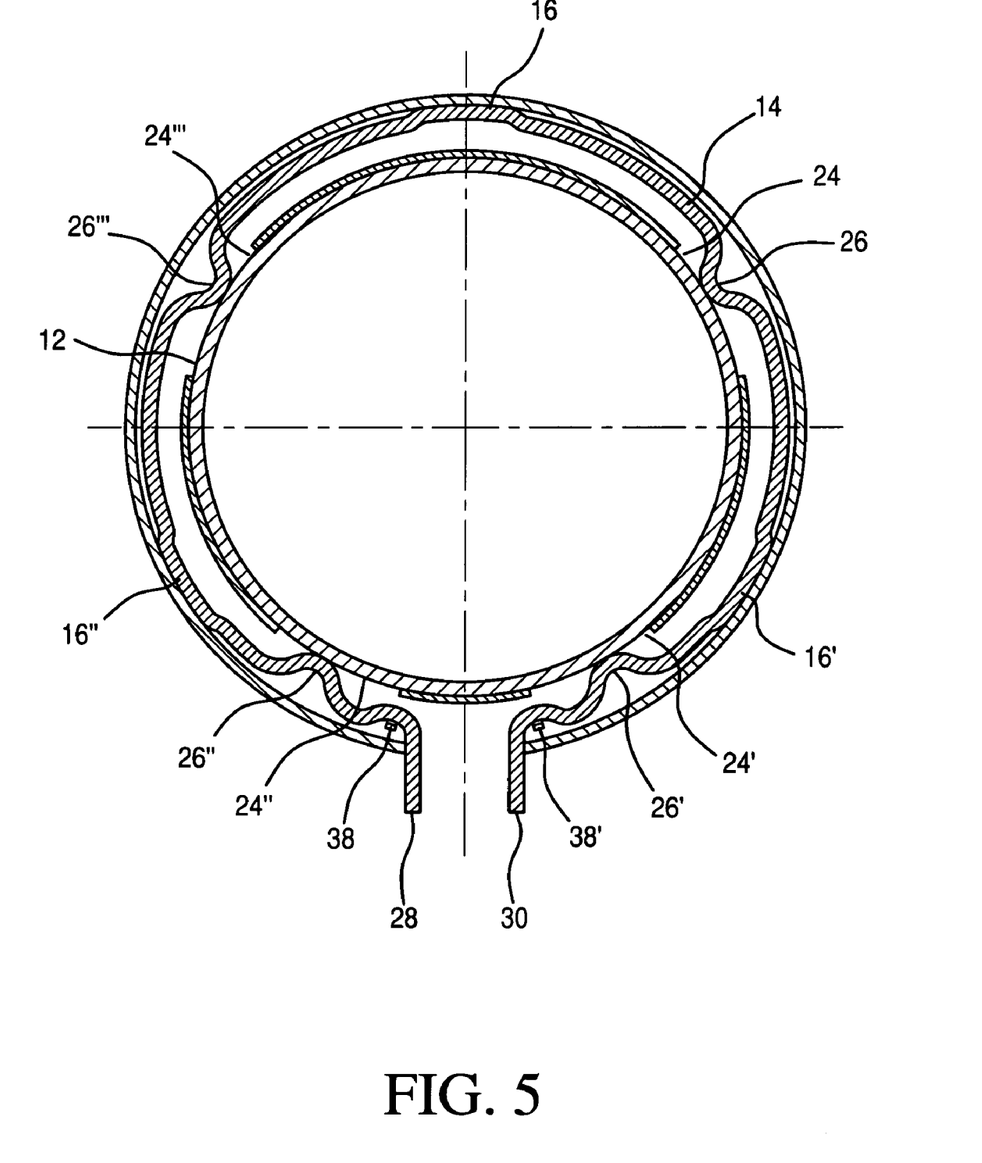

FIG. 5 shows a radial section along a line V-V in FIG. 4.

When the hose 2 reaches a predetermined axial position relative to the pipe stub 4 which defines the assembly position of the hose 2, the holding ring 20 comes to lie axially against the shoulder 32, while at the same time the latching projections (16, 16', 16") under the spring action of the spring ring 14 latch into the associated latching cutouts (18, 18' and 18") and thus latch the hose 2 directly to the pipe stub 4. In the assembled position, the hose 2 is thus latched with the pipe stub 4 and therefore securely fastened to the pipe stub 4, even when subjected to axial loading. As can be seen from FIG. 1, in the assembled position, the insertion end of the hose 2, which is formed in a substantially complementary manner to the contact region 8 of the pipe stub 4, lies closely against the radial inner wall 6 of the pipe stub 4, thereby resulting in effective sealing between the hose 2 and pipe stub 4.

Overpresssure, which occurs in the interior of the hose 2 during the use thereof, presses the hose firmly against the radial inner wall 6 of the pipe stub 4, thereby further improving the sealing.

When overpressure occurs inside the hose 2, the radial outer surface 12, which forms the shell of the hose 2, presses the spring ring 14 with an additional force concentrically against the radial inner wall 6 of the pipe stub 4. In this way, the press fit of the spring ring 14 is increased beyond its inherent stress, with the result that the security of the connection between the hose 2 and the pipe stub 4 is substantially improved.

The hose according to the invention thus allows a simple and secure assembly of the hose 2 on the pipe stub 4 which can be performed without tools.

In the embodiment illustrated in the drawing, the latching device forms a releasable latching connection between the hose 2 and the pipe stub 4. As can be seen in FIG. 1, in this embodiment, the free ends (28, 30) of the spring ring 14 protrude, in the assembled position, beyond the radial outer wall of the pipe stub 4. To release the latching connection between the hose 2 and the pipe stub 4, the free ends (28, 30) of the spring ring 14 are pressed together, with the result that the spring ring 14 is compressed in the radial direction and the latching projections (16, 16', 16") move inwardly in the radial direction. Here, they disengage from the latching cutouts (18, 18' and 18"), with the result that the hose 2 is unlatched from the pipe stub 4 and can be withdrawn to the right in the axial direction in FIG. 1. Disassembly of the hose 2 according to the invention from the pipe stub 4 is thus designed to be likewise particularly simple.

In order to prevent the spring ring 14 from expanding too far and thereby making assembly more difficult as a result of the latching projections (16 to 16") projecting too far in the radial direction, two holding lugs (38, 38') are provided (FIGS. 2 and 5). The holding lugs (38, 38') can be formed in particular in one piece with the holding ring 20, for example, be stamped out of the holding ring 20 and be bent out of the holding ring 20 so as to extend in the axial direction or circumferential direction. While such an embodiment, given the one-piece design of the holding lugs (38, 38') with the holding ring 20, can be produced in a particularly simple and thus cost-effective manner, the holding lugs (38, 38') can also be formed by separate components in particular connected to the holding ring 20. Instead of the holding lugs (38, 38'), it is possible according to the invention to provide other means which limit the radial expansion of the spring ring 14 to a predetermined degree.

In summary, the charge-air hose assembly according to the invention can be produced simply and cost-effectively and be assembled and disassembled in a particularly simple manner while offering excellent long-term sealing in the assembled position.

It is understood that the foregoing description is that of the preferred embodiments of the invention and that various changes and modifications may be made thereto without departing from the spirit and scope of the invention as defined in the appended claims.

What is claimed is:

1. A charge-air hose assembly comprising:
   a pipe stub having a radial wall and a longitudinal axis defining an axial direction;
   a charge-air hose having a radial outer surface and being insertable into said pipe stub in a manner so as to cause an overpressure in said charge-air hose to press said charge-air hose radially outwardly against said radial wall of said pipe stub,
   said charge-air hose having an insertion end and said pipe stub having a contact region at said radial wall receiving said insertion end in contact engagement therewith when said charge-air hose is inserted into said pipe stub in said axial direction to an axial position;
   said insertion end having a cross section that is complementary in shape to a cross section of said contact region so as to cause said insertion end and said contact region to conjointly define a seal between said pipe stub and said charge-air hose at said axial position in response to said overpressure;
   a latching device for fixing said charge-air hose in said pipe stub at said axial position of said charge-air hose relative to said pipe stub as said charge-air hose is inserted into said pipe stub in said axial direction;
   said latching device including: a holder mounted on said outer surface of said charge-air hose; an annular spring disposed in said holder with said holder and said annular spring being insertable into said pipe stub as part of said charge-air hose;
   said annular spring being resiliently biased in an outward radial direction; and,
   said radial wall of said pipe stub having a slot formed therein for receiving said annular spring therein when said charge-air hose is inserted into said pipe stub causing said charge-air hose to latch with said pipe stub at said axial position.

2. The charge-air hose assembly of claim 1, wherein said holder is an essentially form-stable holder for holding said annular spring to said charge-air hose.

3. The charge-air hose assembly of claim 2, wherein said form-stable holder is connected in a form-fitting manner to said charge-air hose in the axial direction.

4. The charge-air hose assembly of claim 3, wherein said charge-air hose has a peripherally extending groove formed in said outer surface thereof and said form-stable holder is accommodated in said peripherally extending groove.

5. The charge-air hose assembly of claim 4, wherein said form-stable holder is configured as a holding ring.

6. The charge-air hose assembly of claim 5, wherein said holding ring has an outer surface; and, said holding ring has a peripherally extending groove formed in said outer surface for accommodating said annular spring therein.

7. The charge-air hose assembly of claim 6, wherein said annular spring has a plurality of radially inwardly projecting segments for supporting said annular spring on said charge-air hose or on said holding ring; and, said annular spring having a latching projection formed thereon projecting radially outwardly to engage said slot at said axial position when said charge-air hose is inserted into said pipe stub.

8. The charge-air hose assembly of claim 7, wherein said annular spring is configured to be open at a location along the periphery thereof so as to define bent-over free end segments extending substantially in a radial direction.

9. The charge-air hose assembly of claim 8, further comprising an axial stop provided for said charge-air hose which is effective in said axial direction.

10. The charge-air hose assembly of claim 9, wherein said axial stop is disposed in said axial direction so as to fix said axial position and to cause said latching device to latch to said pipe stub when said charge-air hose arrives at said axial position relative to said pipe stub.

11. The charge-air hose assembly of claim 10, wherein said axial stop is defined by a shoulder formed on the radial inner wall of said pipe stub.

12. The charge-air hose assembly of claim 8, further comprising means for fixing said charge-air hose in a peripheral direction relative to said pipe stub when said charge-air hose is inserted into said pipe stub.

13. The charge-air hose assembly of claim 12, wherein said pipe stub has a free end; and, said fixing means comprises a slot formed in said pipe stub and extending from said free end in said axial direction for receiving and accommodating said bent-over free end segments when said charge-air hose is inserted into said pipe stub.

14. The charge-air hose assembly of claim 13, wherein said latching device defines a releasable latch connection between said charge-air hose and said pipe stub when said charge-air hose is in said axial position and inserted into said pipe stub.

15. The charge-air hose assembly of claim 14, wherein said pipe stub has a radial outer wall surface; and, said bent-over free end segments extend beyond said radial outer wall surface.

16. The charge-air hose assembly of claim 1, wherein said pipe stub has a free end facing toward said charge-air hose when said pipe stub and said charge-air hose are assembled; and, said free end has a peripherally extending bevel formed thereon to facilitate the insertion of said charge-air hose into said pipe stub.

17. The charge-air hose assembly of claim 1, wherein said slot is a peripherally extending slot formed in said radial wall.

18. A charge-air hose assembly comprising:
a pipe stub having a radial wall and a longitudinal axis defining an axial direction;
a charge-air hose having a radial outer surface and being insertable into said pipe stub in a manner so as to cause an overpressure in said charge-air hose to press said charge-air hose radially outwardly against said radial wall of said pipe stub,
said charge-air hose having an insertion end and said pipe stub having a contact region at said radial wall receiving said insertion end in contact engagement therewith when said charge-air hose is inserted into said pipe stub in said axial direction to an axial position;
said insertion end having a cross section that is complementary in shape to a cross section of said contact region so as to cause said insertion end and said contact region to conjointly define a seal between said pipe stub and said charge-air hose at said axial position in response to said overpressure;
a latching device for fixing said charge-air hose in said pipe stub at said axial position of said charge-air hose relative to said pipe stub as said charge-air hose is inserted into said pipe stub in said axial direction;
said latching device consisting of a holder mounted on said outer surface of said charge-air hose; an annular spring disposed on said holder and said annular spring being resiliently biased in an outward radial direction toward said radial wall of said pipe stub;
said annular spring having a segment thereof defining a projection which projects outwardly in said radial direction; and,
a peripherally extending slot formed in said radial wall of said pipe stub for receiving said projection therein when said charge-air hose is inserted into said pipe stub causing said projection to engage said slot to latch said charge-air hose with said pipe stub at said axial position.

19. The charge-air hose assembly of claim 17, wherein said charge-air hose is a bellows charge-air hose.

20. A charge-air hose assembly comprising:
a pipe stub having a radial wall and a longitudinal axis defining an axial direction;
a charge-air hose having a radial outer surface and being insertable into said pipe stub in a manner so as to cause an overpressure in said charge-air hose to press said charge-air hose radially outwardly against said radial wall of said pipe stub,
said charge-air hose having an insertion end and said pipe stub having a contact region at said radial wall receiving said insertion end in contact engagement therewith when said charge-air hose is inserted into said pipe stub in said axial direction to an axial position;
said insertion end having a cross section that is complementary in shape to a cross section of said contact region so as to cause said insertion end and said contact region to conjointly define a seal between said pipe stub and said charge-air hose at said axial position in response to said overpressure;
a latching device for fixing said charge-air hose in said pipe stub at said axial position of said charge-air hose relative to said pipe stub as said charge-air hose is inserted into said pipe stub in said axial direction;
said latching device including: a holder mounted on said outer surface of said charge-air hose; an annular spring disposed in said holder with said holder and said annular spring being insertable into said pipe stub as part of said charge-air hose;
said annular spring being resiliently biased in an outward radial direction;
said radial wall of said pipe stub having a slot formed therein for receiving said annular spring therein when said charge-air hose is inserted into said pipe stub causing said charge-air hose to latch with said pipe stub at said axial position; and,
said insertion end having a cross section that is formed as a circular arc.

* * * * *